United States Patent Office 3,485,217
Patented Dec. 23, 1969

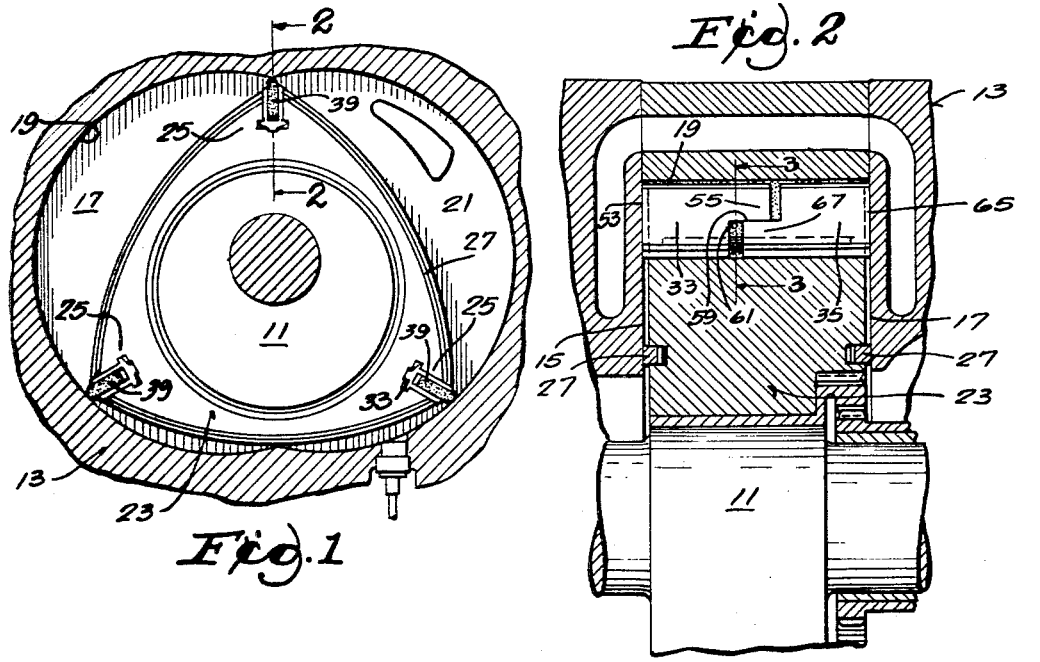

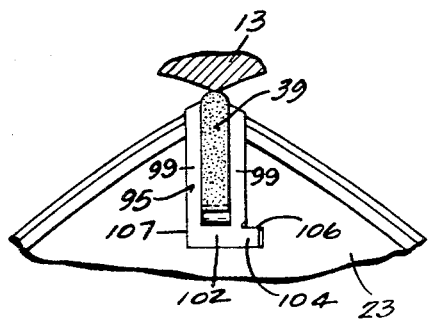
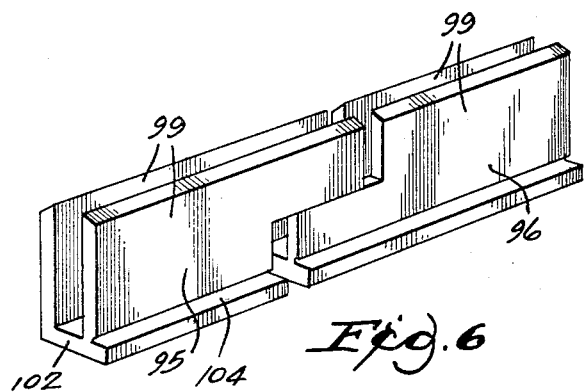
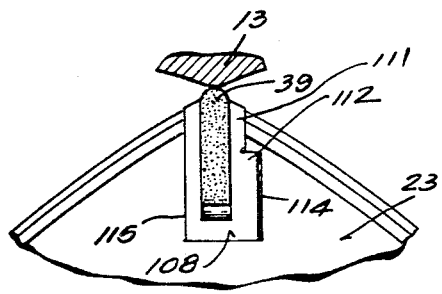
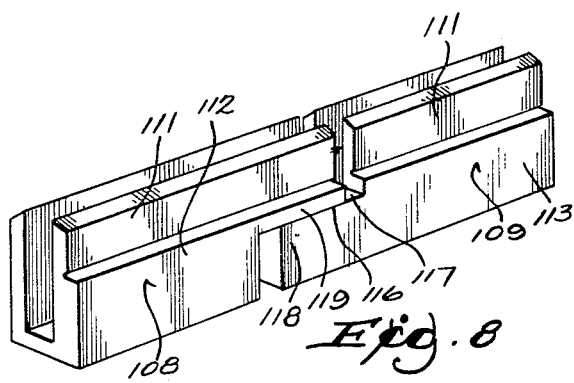

3,485,217
APEX SEAL FOR ROTARY COMBUSTION ENGINE
Finn T. Irgens, Milwaukee, Wis., assignor to Outboard Marine Corporation, Waukegan, Ill., a corporation of Delaware
Filed Oct. 3, 1967, Ser. No. 672,545
Int. Cl. F01c *19/04*
U.S. Cl. 123—8                                         9 Claims

ABSTRACT OF THE DISCLOSURE

Disclosed herein is a rotary piston internal combustion engine which is provided with side wall sealing members located in recesses at each rotor apex portion. The side wall sealing members are generally U-shaped and receive an end wall sealing member between the legs. A spring located between the side wall sealing members biases the sealing members into sealing engagement with the engine side walls. The rotor or piston and the side seal members are provided with co-operating means to prevent radial outward movement of the side seal members while affording movement of the side sealing members axially of the rotor.

Background of the invention

The invention relates generally to internal combustion engines of the rotary piston type. More particularly, the invention relates to arrangements for sealing the rotor of such engines with the walls of the enclosing housing.

In previous rotor sealing arrangements the end wall sealing member was received in a slot which was formed, in part, in the rotor and, in part, in the side wall sealing members carried by the rotor. This arrangement presented an alignment problem between the slots in the rotor and in the side wall sealing members.

Summary of invention

One of the principal objects of the invention is the provision of a rotor sealing arrangement which avoids this previous alignment problem.

Another principal object of the invention is the provision of a rotor sealing arrangement which is economical to manufacture, which affords support of the end wall sealing members by the side wall sealing members in adjacent relation to the area of end wall sealing engagement, and/or which provides for effective heat conduction away from the end wall sealing member.

In accordance with the invention, there is provided, at each rotor apex portion, a recess into which a pair of axially adjacent generally U-shaped side wall sealing members are received. Received between the legs of the side wall sealing members is an end wall sealing member. Also in accordance with the invention, the legs of the side wall sealing members extend into close proximity to the sealing edge of the end wall sealing member to support the sealing edge and to afford heat conduction away from the end wall sealing edge. Means already known can be employed to bias the end wall sealing member and the side wall sealing members into sealing engagement with the respective housing walls.

Other objects, advantages and features of the invention will become known by reference to the following description and accompanying drawings in which:

FIGURE 1 is a sectional plan view of a rotary piston internal combustion engine employing various of the features of the invention.

FIGURE 2 is an enlarged fragmentary sectional view taken generally along line 2—2 of FIGURE 1.

FIGURE 3 is a fragmentary sectional view taken along line 3—3 of FIGURE 2.

FIGURE 4 is an enlarged view of a portion of the construction shown in FIGURE 2.

FIGURE 5 is an exploded perspective view of various of the components employed in the engine shown in FIGURE 1.

FIGURE 6 is a perspective view of a modified embodiment of the invention.

FIGURE 7 is an end view of the device shown in FIGURE 6 mounted in a rotor.

FIGURE 8 is a perspective view of a further modified embodiment of the invention.

FIGURE 9 is an end view of the device shown in FIGURE 8 mounted in a rotor.

Detailed description

Shown in the drawings is a rotary piston engine 11 including a housing 13 having, internally, a pair of spaced generally parallel side walls 15 and 17 and an arcuate peripheral end wall 19 defining a multi-lobed cavity 21. Carried by suitable bearings supported by the housing 13 is a rotor or piston 23 rotatable about an axis which is conventionally normal to the side walls 15 and 17 and parallel to the end wall 19. The piston 23 includes several apex portions 25, one or more in number than the number of lobes in the cavity 21. At each of the apex portion 25, there is provided an arrangement for effecting a seal with the interior walls of the cavity. Extending peripherally of the rotor between the apex portions are side wall sealing strips 27. As thus far described, the construction is conventional.

In accordance with the invention, the sealing arrangement comprises, at each apex portion, a recess 31, a pair of side wall sealing members 33 and 35 which are located in axially adjacent relation in the recess 31, which are preferably constructed of hardened steel or similar hard metal, and which include respective aligned slots 37 for jointly receiving a block 39 which is constructed of carbon or other material having similar wear and lubricating properties and which constitutes an end wall sealing member.

Each recess 31 extends in generally parallel relation to the axis of piston rotation, is outwardly open, and extends inwardly from the outermost portion of the associated apex portion 25. Each recess 31 is defined by a pair of spaced parallel side walls 41 and 43 and, at its inner end, by a transversely enlarged rectangular portion or groove 45 extending across the recess as shown in FIGURE 3.

The side wall sealing member 33 is generally of U-shape, having a pair of opposed walls or legs 47 which are joined at their inner ends by a web portion 49. Defined between the legs 47 and by the web portion 49 is the inwardly extending slot 37 which at least partially receives the block 39.

The side wall sealing member 33 includes, at one end, a generally flat face 53 adapted to sealingly engage the side wall 17 of the cavity 21. At its other end, the side wall sealing member is stepped, as shown in FIGURES 2 and 3, to provide a projecting part 55 located remotely from the web 49 and defined, in part, by wall surfaces 57 and 59. The side wall sealing member is further defined by a wall surface 61.

The other side wall sealing member 35 is of similar construction to the member 33 just described, including a side wall sealing face 65 and a slot 37 defined between a pair of legs 47 and except that one end of the side wall sealing member 35 includes a projecting part 67 adjacent to the web and defined in part by wall surfaces 69 and 71. The remainder of this end of the side wall sealing member 35 is defined by a wall surface 73 which is normally located in spaced relation to the wall 57 of the other side wall sealing member 33. The respective walls 61 and 67 of the side wall sealing members 33 and 35 are generally arranged in sliding engagement with each other as shown in the drawings. The spacing of the walls 57 and 73 and the walls 61 and 69 permits entry therebetween of pressure gas formed during operation of the engine to afford yieldable biasing of the side wall sealing members 33 and 35 away from each other and into respective sealing engagement with the side walls 15 and 17. Either additionally, or alternatively, one or more springs, such as shown at 77, can be located between the walls 61 and 69 and/or between the walls 57 and 73 to maintain the sealing members 33 and 35 in sealing engagement with the cavity side walls 15 and 17.

Each of the side wall sealing members 33 and 35 is guided for movement in the direction parallel to the axis of piston rotation by engagement of a surface 79 on the web portion 49 with the wall at the bottom of the recess 31 and by engagement between a pair of spaced shoulders 81 on the web portion 49 and cooperating wall surfaces 83 of the transversely elongated rectangular recess portion 45 (see FIGURE 3). Engagement of the shoulders 81 with the wall surfaces 83 also serves to prevent movement of the side wall sealing members 33 and 35 outwardly of the recess 31 in a direction radial with respect to the axis of rotation.

As noted previously, carbon block 39 is received in the slots 37 of the side wall sealing members 33 and 35 and is generally of rectangular form having a width which is slightly less than the width of the slots 37 to afford sliding engagement with the walls of the slots. The block 39 has a length slighty less than the distance between the cavity side walls 15 and 17 and includes an outer rounded sealing edge 85 which sealingly engages the cavity end wall 19. As shown in FIGURE 3, the legs 47 of the side wall sealing members extend beyond the outermost part of the associated apex portion to adjacent the sealing edge 85 to support the edge and assist in conducting heat from the block 39.

The edge 85 can be yieldably biased into engagement with the cavity end wall 19 by gas pressure against the block edge 87 opposed from the sealing edge 85. Alternatively, or in addition, the block 39 can be biased against the cavity end wall 19 by one or more springs. In the disclosed construction, the inner edge 87 of the block is recessed to provide, adjacent each of the ends of the block edge, an ear 89. Located between the ears 89 and bearing against the bottom wall 91 of the side wall sealing member slots 37 and the adjacent edge 87 of the block 39 is a leaf spring 93.

During operation, the spring 77 and/or gas pressure serves to bias the side wall sealing members 33 and 35 into sealing engagement with the respective end walls 15 and 17 and the spring 93 and/or gas pressure serves to bias the carbon block 39 into engagement with the end wall 19 of the cavity 21.

As compared to prior constructions, the disclosed construction facilitates economic manufacture of the sealing arrangement. Specifically, the apex portion recesses 31 can be readily broached and the side wall sealing members 33 and 35 and block 39 can also be easily machined.

The considerable depth of the slots 37 which are located in the side wall sealing members 33 and 35 and which slidably receive the carbon block 39 serve to provide support for the block 39 adjacent to the point of sealing engagement with the cavity end wall 19. In addition, the proximity of the legs 47 of the sealing members 33 and 35 to the sealing edge 85 of the block 39 and the relatively large engaged area between the block 39 and the legs 47 of the side wall sealing members 33 and 35 serves to facilitate heat transmission from the block 39 to the side wall sealing members and thence to the rotor 23, thereby aiding in maintaining the temperature of the block 39 at a relatively low level.

As already mentioned, the disclosed construction also serves to eliminate previous alignment problems in such cases wherein the side wall sealing members were shiftably mounted in the rotor and the end wall sealing members were supported adjacent the sealing edge, by the rotor proper and extended, remotely from the sealing edge, into slots or grooves in the shiftably mounted side wall sealing members. In such constructions, the end wall sealing member was subject to shear at the juncture of the side wall sealing members and the rotor.

Another advantage of the disclosed construction resides in the utilization of hardened steel or other similar material for the side wall sealing members 33 and 35. Specifically, under certain circumstances, side wall sealing strips are urged with considerable force edgewise against the sides of the side wall sealing members. The use of hardened steel serves to reduce wear in the area of engagement between the ends of the side wall sealing strips 27 and the side wall sealing members 33 and 35. Excessive wear between these components in directions axially of the rotor 23 could result in paths affording pressure gas leakage from the combustion chambers.

The means preventing outward movement of the side wall sealing members 33 and 35 also serves to limit wear between the side wall sealing members and the side wall sealing strips 27 by preventing radial movement of the side wall sealing members 33 and 35 relative to the ends of the side wall sealing strips 27.

Still further, as the end wall sealing member 39 is the only member which moves radially relative to the rotor axis, and as the mass or weight of the end wall sealing member or block 39 is relatively small, the end wall sealing member is relatively free from the effects of centrifugal force, thereby avoiding excessive normal forces between the sealing block 39 and the cavity end wall 19 during high-speed operation.

FIGURES 6 and 7 show a modified construction of the side wall sealing members 95 and 96. In this embodiment each of the side wall members 95 and 96 includes legs 99 connected by a web portion 102 and, as in the construction shown in FIGURES 1 through 5, cooperating means preventing radial movement of the side wall sealing members are provided. Such means includes an outwardly extending shoulder or flange 104 which extends from and which is of the same thickness as the web 102. Such means also includes a groove 106 in the recess 107 of the rotor 23, as shown in FIGURE 7, into which groove the shoulder 104 extends. This embodiment is relatively inexpensive to manufacture as compared with the embodiment in FIGURE 5.

Further modified side wall sealing members 108 and 109 are illustrated in FIGURES 8 and 9. In this construction, the side wall sealing member 108 includes a relatively wide shoulder 112 located along and extending longitudinally of the side leg 111. The side wall sealing member 109 also includes a wide shoulder 113. Shoulders 112 and 113 interfit with a wide groove 114 in a recess 115 in the rotor 23, the recess 115 and the groove 114 being in generally parallel relation to the axis of piston rotation. The shoulder 112 includes an extension 119 which has a wall surface 116 in engagement with a surface 117 of a projecting part 118 of side seal member 109.

As seen in FIGURES 6 through 9, it is desirable that the side wall cross-sectional configuration of the side wall sealing members generally mates with the cross-sectional contour of the associated recess.

The operation of the side wall sealing members 95, 96 and 108, 109 illustrated in FIGURES 6 and 8 is similar to the operation of the side wall sealing members 33 and 35 hereinabove described.

Reference is hereby made to my co-pending application, Ser. No. 443,012.

Various of the features of the invention are set forth in the following claims.

What is claimed is:

1. In an internal combustion engine of the rotary piston type, the combination of a housing having spaced side walls and a peripheral end wall defining an internal cavity, a piston rotatably mounted in said housing for rotation in said cavity about an axis transverse to said side walls and parallel to said end wall, said piston having one or more apex portions each including a recess extending in a radial direction generally parallel to said axis and inwardly of the outermost part of said apex portion, a pair of side wall sealing members located in said recess in adjacent relation to each other axially of said recess, said side wall sealing members respectively having therein outwardly opening slots extending in alignment with each other and in generally parallel relation to said recess, means between adjacent surfaces of said side wall sealing members for yieldably biasing said side wall sealing members axially away from each other and into engagement with the respective side walls of said cavity, and an end wall sealing member in said slots.

2. An internal combustion engine in accordance with claim 1 including means located in said slots between said end wall sealing member and said side wall sealing members for yieldably biasing said end wall sealing member against said cavity end wall.

3. An internal combustion engine in accordance with claim 1 wherein said end wall sealing member includes a sealing edge adapted to engage said cavity end wall, wherein said side wall sealing members are U-shaped and include two spaced legs defining, at least in part, said slots, and wherein said legs extend radially outwardly at least as far as the adjacent portion of said rotor and adjacent to said sealing edge of said end wall sealing member.

4. An internal combustion engine in accordance with claim 1 wherein said side wall sealing members and said recess include co-operating means preventing radially outward movement of said side wall sealing members in said recess while affording movement in directions axially of said rotor.

5. An internal combustion engine in accordance with claim 1 wherein said side wall sealing members are constructed of hardened steel and said end wall sealing member is constructed of carbon.

6. An internal combustion engine in accordance with claim 1 wherein said recess includes two transversely extending grooves adjacent said bottom and extending therefrom, each of said grooves including at least one transversely extending flat surface and wherein each of said side wall sealing members has two transversely extending shoulders having at least one flat surface which cooperates with said flat surfaces of said grooves to afford a fluid seal therebetween and prevent radially outward movement of said side wall sealing members.

7. An internal combustion engine in accordance with claim 1 wherein each of said side seal members has a shoulder and one of said shoulders has first and second portions and said second portion is of less dimension in the radial direction than said first portion, said second portion having a flat axially extending surface and wherein said shoulder of said other side seal member has first and second shoulder portions and said first shoulder portion extends from said second portion, said first shoulder portion having a flat surface which cooperates with said flat surface on said second shoulder portion of said other side seal member to afford a fluid seal therebetween.

8. In an internal combustion engine of the rotary piston type, the combination of a housing having spaced side walls and a peripheral end wall defining an internal cavity, a piston rotatably mounted in said housing for rotation in said cavity about an axis transverse to said side walls and parallel to said end wall, said piston having one or more apex portions each including a recess extending in a radial direction generally parallel to said axis and inwardly of the outermost part of said apex portion, a pair of side wall sealing members of hardened material located in said recess in adjacent relation to each other axially of said recess, a spring located between said side wall sealing members and engageable with both of said side wall sealing members for yieldably biasing said side wall sealing members axially away from each other and into engagement with the respective side walls of said cavity, said side wall sealing members respectively being U-shaped and inclduing two spaced legs defining therebetween outwardly opening slots extending in alignment with each other and in generally parallel relation to said recess, said legs extending radially outwardly from said recess, means on said side wall sealing members and on said recess for preventing radially outward movement of said side wall sealing members in said recess while affording movement in directions axially of said rotor, an end wall sealing block of carbon in said slots, said end wall sealing block including a sealing edge adapted to engage said cavity end wall and located adjacent to the outer ends of said legs, and a spring located between said end wall sealing block and said side wall sealing members for yieldably biasing said end wall sealing block against said cavity end wall.

9. In an internal combustion engine of the rotary piston type, the combination of a housing having spaced side walls and a peripheral end wall defining an internal cavity, a piston rotatably mounted in said housing for rotation in said cavity about an axis transverse to said side walls and parallel to said end wall, said piston having one or more apex portions each including a recess extending in a radial direction generally parallel to said axis and inwardly of the outermost part of said apex portion, said recess including two parallel spaced wall portions which extend generally radially of said piston, said recess further including a groove extending transversely to said parallel wall portions, a pair of side wall sealing members located in said recess in adjacent relation to each other axially of said recess, said side wall sealing members each including adjacent the radial innermost edge thereof an outwardly extending shoulder, said shoulder cooperating with said groove in said recess to retain said side wall sealing members against radially outward movement, and said side wall sealing members respectively having outwardly opening slots extending in alignment with each other and in generally parallel relation to said recess, and an end wall sealing member in said slots.

References Cited

UNITED STATES PATENTS

| | | |
|---|---|---|
| 674,258 | 5/1901 | Croston. |
| 3,127,095 | 3/1964 | Froede. |
| 3,161,350 | 12/1964 | Lorcher. |
| 3,235,171 | 2/1966 | Frenzel et al. |

C. J. HUSAR, Primary Examiner